ELECTRONIC COLOR VIEWER AND PRINT TIMER

Filed Feb. 17, 1966 4 Sheets-Sheet 1

INVENTORS
ALEX W. DREYFOOS, JR.
GEORGE W. MERGENS
BY Curtis Ailes
ATTORNEY

Dec. 17, 1968 A. W. DREYFOOS, JR., ET AL 3,417,196

ELECTRONIC COLOR VIEWER AND PRINT TIMER

Filed Feb. 17, 1966 4 Sheets-Sheet 4

United States Patent Office 3,417,196

Patented Dec. 17, 1968

3,417,196

ELECTRONIC COLOR VIEWER AND PRINT TIMER

Alex W. Dreyfoos, Jr., Port Chester, N.Y., and George W. Mergens, Wilton, Conn., assignors to Photo Electronics Corporation, Byram, Conn., a corporation of New York Continuation-in-part of application Ser. No. 453,144, May 4, 1965. This application Feb. 17, 1966, Ser. No. 528,175

The portion of the term of the patent subsequent to Nov. 7, 1984, has been disclaimed 18 Claims. (Cl. 178—5.2)

ABSTRACT OF THE DISCLOSURE

FIG. 1 shows a flying spot scanner 12 which scans color negative 10 to provide optical signals to photomultiplier 16. These signals are amplified at 32 and 34 for display on picture tube 24. Photo-optical switches controlled by aperture disc 30 provide synchronizing and switching signals for operation of the single channel ampifier system in sequence for three different colors and for gating color adjustment signals from amplifier connection 86 to capacitors 122, 123, 124 (FIG. 3). These stored color adjustment signals are available for control of print timer apparatus of FIG. 3.

This is a continuation-in-part of U.S. patent application Ser. No. 453,144, filed May 4, 1965, now Patent 3,351,707, for "Electronic Color Viewer."

This invention relates to electronic viewers for color pictures, and particularly to viewers which are capable of providing adjustabe color balance and of deriving correct printing information for producing photographic color prints.

The viewer systems in accordance with the present invention are technically properly described as "television" systems since they convert optical information to electrical information and then reconvert the electrical information back to optical information. However, the results achievable with the present invention are so much better than the results normally associated with television systems, either of the closed circuit, or remote radio transmission types, that the systems of the present invention should not be classified with conventional television systems. Furthermore, in conventional television systems, the basic objective is generally to provide for the transmission of pictorial information over substantial physical distances. That is not the objective of the present invention.

The basic objective of systems such as that of the present invention is to provide a clear positive color picture representation, with adjustable color balance, directly from a photographic record of the pictorial information which does not have the correct representation of color values for pleasant viewing. For instance, the original may be a positive print with incorrect color values, or a color negative which must be reversed to a positive representation of color values as well as corrected for color values.

A particular object of the present invention is to provide a carefully calibrated and regulated electronic color viewer in which the color balance adjustments serve as print timing information for the control of photographic color printing apparatus.

A number of prior attempts have been made to produce electronic color viewers which are particularly intended for deriving color print timing information. For instance, U.S. Patent 2,863,938, Evans et al., shows such a system. However, it has been tyical of all such prior systems that they have relied very heavily upon the conventional television system practice, with the result that such systems have been very complex and expensive.

By contrast, the electronic color viewer in accordance with the present invention is very simple, and yet it produces high quality results. The system simplicity carries with it a tremendous improvement in reliability and maintenance free operation, and a very impressive reduction in the cost of the system. For instance, very satisfactory electronic color viewers may be produced in accordance with the present invention at a cost which is less than one-third of the cost of prior systems constructed along the lines of that shown in the Evans patent. At the same time the invention provides certain important improvement features over such prior systems.

Prior electronic color viewer designs have usually been based upon the assumption that all of the color components generally three in number, must be simultaneously sensed and transmitted and reproduced in order to achieve a satisfactory result. However, in accordance with one aspect of the present invention, it has been discovered that very satisfactory results in electronic color viewers may be achieved by means of a sequence color system which may employ rotating color filter masks, and that tremendous system simplification may accompany the adoption of the sequence system.

The color sequence system referred to herein is analogous in many ways to a color television system once developed in detail and demonstrated by the television engineering department of the Columbia Broadcasting System, Inc., of New York. New York. Descriptions of that system were published, for instance, in the proceedings of the Institute of Radio Engineers under the titles "Color Television, Part I," appearing in the April 1942 issue on pages 162 through 182, and "Part II" appearing in the September 1943 issue on pages 465 through 478. However, the electronic color viewers in accordance with the present invention are quite different in many ways, from such prior sequence color television systems. Many of these differences may be described rather broadly by characterizing the systems of the present invention as integrated electronic color viewers in which the mechanical and electrical features of the system are more completely and intimately combined in function and structure than any similar prior system. The inventors have discovered that such integration and combination is possible, partly by recognizing that the objective of the system does not include the transmission of pictorial information over substantial distances so that the usual constraints of television sytems do not necessarily apply.

Another object of the present invention is to provide an electronic color viewer having improved color reproduction.

Another important object of the present invention is to provide a system which automatically adjusts itself towards a correct color balance, so that only minimal manual adjustments are necessary to provide a pleasing representation of a photographic color original, and which automatically provides electrical output signals precisely indicating the best relative print exposures for each color.

Another object of the present invention is to provide an electronic color viewer which is more rapidly adjustable to achieve a pleasing color balance and which is capable of providing exact color printing information.

Another object of this invention is to provide a color print timer which is quickly adjustable through a combination of automatic and manual adjustment to supply color print exposure information which is reasonably close to the precise requirements of any particular color negative.

In the parent patent application Ser. No. 453,144, there is described the operation of the electronic color viewer in both a calibrated mode and in an integrated mode. In the calibrated mode in the embodiment disclosed in that patent application, exact printing information is obtained. In the so-called "integrated" mode, a faster adjustment of a pleasing color representation of the negative is achieved, but printing information is not obtained.

It is another object of the present invention to provide an improved electronic color viewer which is capable of operation in an "integrated" mode having means for automatic adjustment towards correct color balance, and operable after final manual adjustment to provide a calibrated output signal for each color which gives precise color printing information.

It is another important object of the present invention to provide a combined color viewer and color printer which provides prints having virtually perfect color balance.

Another object of the invention is to provide an improved color print machine incorporating a viewer which enables the operator to adjust the printer for the most pleasing color balance, and with great accuracy, before the printer is operated.

Further objects and advantages of the invention will be apparent from the following description and the accompanying drawings.

In carrying out the invention in one preferred embodiment thereof, there may be provided a photoelectronic scanner arranged to scan a color photographic original, and to generate electrical signals in accordance therewith. An amplifier is provided to receive the electrical signals and is connected to provide the amplified signals to at least one cathode ray picture tube. An integrating means is connected to the amplifier for deriving an electrical signal level for each color representative of an integrated value of the intensity of that color for the entire picture as detected by the photoelectronic scanner. A switching means is provided which is operable to connect the integrated color signals to regulate the gain of the photoelectric scanner and the amplifier to thereby automatically adjust the system in the direction of a correct color balance. Signal storage means is provided and connected to the amplifier for deriving and storing electrical signals corresponding to the regulated gain adjustments.

In accordance with another aspect of the invention, the system may include a color printer which is automatically operable in accordance with the stored electrical signals corresponding to the regulated gain adjustments.

Figure 1:
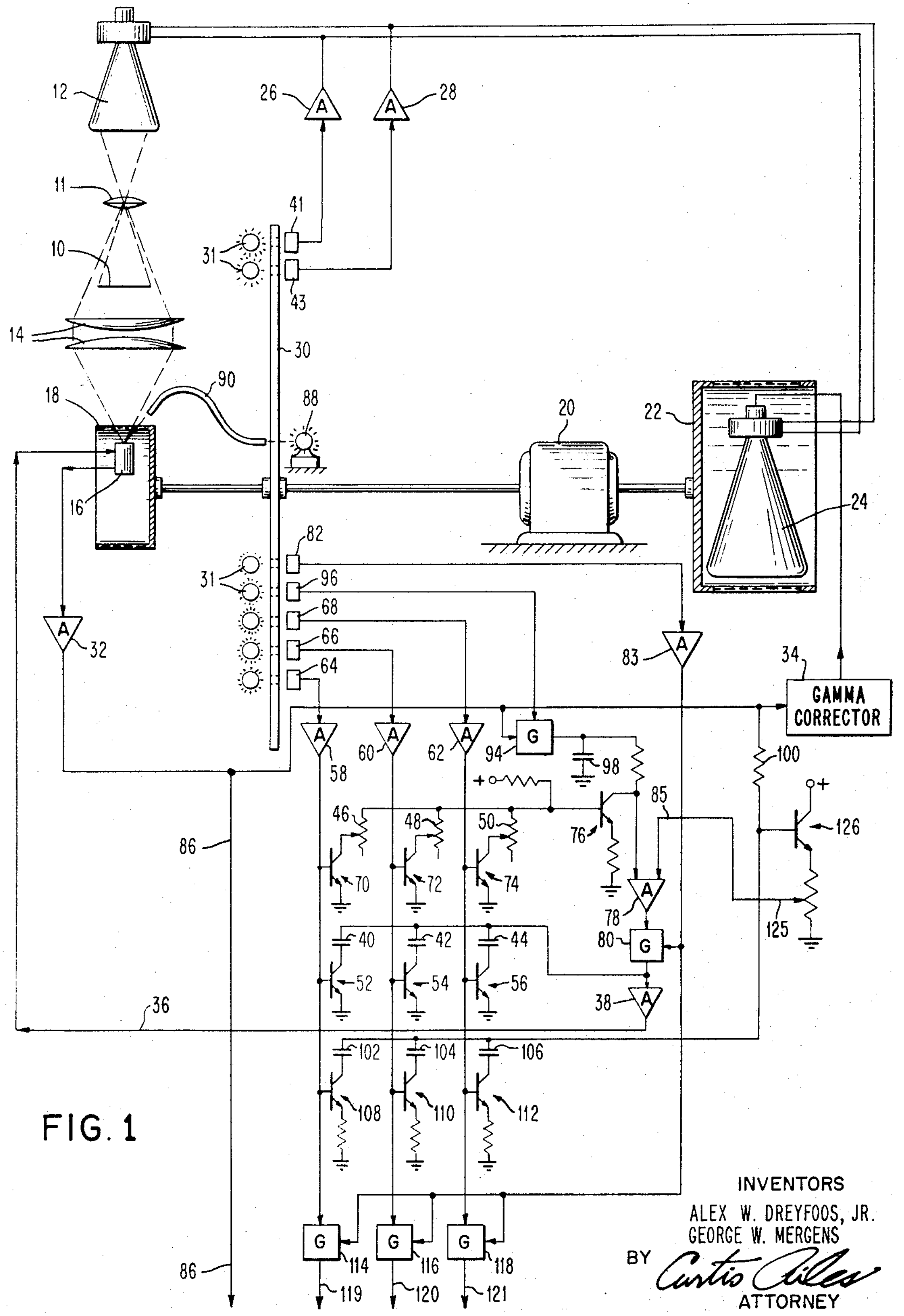
FIG. 1 is a simplified schematic representation of a preferred embodiment of an electronic color viewer in accordance with the present invention.

The operation of the embodiment of the invention as shown in FIG. 1 may be briefly described as follows:

A color negative 10 which is to be viewed is scanned by a flying spot scanner 12, the beam being focused on the negative by an objective lens 11. The optical signals from the flying spot scanner 12, passing through lens 11, are focused by relay lenses 14 upon a photomultiplier tube 16. This illumination passes through a multiple color mask drum 18 which is rotated by a motor 20. A corresponding color masking drum 22 is also rotated in synchronism by the motor 20 for a picture tube 24.

Common sweep circuits including amplifiers 26 and 28 are provided for both the horizontal and vertical sweep signals for both the flying spot scanner 12 and the picture tube 24. The sweep signals for these common sweep circuits, and all of the other timing signals necessary for operation of the system are provided from a timing element 30 which is fastened to and rotates with the shaft of the motor 20. Thus, the timing is mechanically synchronized with drums 18 and 22. The timing element 30 is illustrated as a perforated disk which provides for the passage of light signals from lamps 31 through slotted perforations to various phototransistors for accomplishing the electrical timing function. The electrical picture signals picked up by the photomultiplier tube 16 are amplified by video amplifier 32, and gamma corrected in a gamma corrector 34 before being supplied to the picture tube 24. The gain of the photomultiplier tube 16 is controlled by the voltage to its dynodes supplied through connection 36 from the dynode amplifier 38. This gain is sequentially changed for each sequence of picture scans through the three different color masks in order to adjust the output to the requirements of the three color values recorded on the negative 10. These adjustments are accomplished by means of voltages stored upon the three capacitors 40, 42, and 44 which are sequentially switched to provide the input control voltage to the dynode amplifier 38.

The flying spot scanner 12 is a conventional cathode ray tube flying spot scanner, preferably of the type having a very short persistence white phosphor. The flying spot is imaged by the objective lens 11 upon the color negative 10. The condensor lens system, including lenses 14, focuses the aperture of lens 11 to substantially a spot on photomultiplier tube 16. Each of the color mask drums 18 and 22 have twelve color mask frames arranged in four repeating sequences of red, green and blue filters. A different number of sequences can be provided if desired.

The timing disk 30 contains timing track apertures for the phototransistors indicated at 41 and 43 to control the horizontal and vertical sweep generators 26 and 28 to provide a separate cathode ray tube raster field each time one of the color filters of each of drums 18 and 22 are respectively positioned over the photomultiplier tube 16 and the picture tube 24. Thus, the photomultiplier tube 16 generates an electrical signal which is a record of the red transmission of the color negative 10 each time a red filter of the drum 18 is positioned in front of the photomultiplier tube. The following field generates a record of the green transmission of the color negative, and the next following field a record of the blue transmission of the color negative. This three-color sequence is repeated continuously and the resultant electrical signals are amplified and high-frequency peaked in the amplifier 32. The high frequency peaking is carried out by conventional means consisting basically of high pass filters and the most important purpose is correcting for phosphor persistence and aperture effects. Linearity corrections are made to the signal from amplifier 32 by passing it through the gamma corrector 34, and then on to the picture tube 24. These linearity corrections are selected to compensate for the combination of the non-linearity in the responses of the display cathode ray tube 24 and the nonlinearity in the color print material which the color negative would normally be printed onto, and in any of the other optical or electrical components between the negative 10 and the optical output to be viewed through the filters of drum 22.

The amplifier 32 and the gamma corrector 34 are perferably constructed in accordance with the teachings of our copending patent application Ser. No. 512,844, filed on Dec. 10, 1965, and entitled Nonlinear Amplifiers and Systems.

In the signal path including amplifier 32, the polarity of the signals is electrically reversed so that the picture represented by the color negative 10 can be viewed as a positive picture at the picture tube 24. This polarity reversal can also be referred to as a phase reversal since it means that an increasing optical energy signal received by the photomultiplier tube 16 results in a decreasing illumination intensity output at the same instant from the display cathode ray tube 24, and vice versa.

The color recorded in the color negative 10 which is detected by the photomultiplier tube when scanned through the red filter of drum 18 is called "cyan." This color is sometimes referred to also as "minus red," since it is the complement of red. The cyan image recorded on the color negative is for the purpose of recording the red image information. When scanned through the red filter, the variations of intensity of the cyan color on the negative are detectable by the photomultiplier tube 16. The other two color components recorded on the color negative are magenta and yellow. The red filter essentially excludes variations in light intensity signals caused by the magenta and yellow color component signals of the color negative. The magenta color component of the negative records the green color information and is primarily detectable when scanned through the green filter of drum 18. Similarly, the yellow negative color is primarily detectable when viewed through the blue filter of drum 18. Each of the red, green, and blue filters of drum 18 are preferably chosen carefully so that the combined maximum pass band of the color spectrum formed by the combination of the illumination produced by the phosphor, the spectral sensitivity of the photomultiplier tube, and the color filter, match the peak color absorption spectrum of the associated negative color. This should generally correspond to the peak of sensitivity of the color print material which is to be used to produce color prints. Matching the peak sensitivity of the color print material is actually the most important consideration. Thus, the green filter, in combination with the remainder of the system, should preferably match the sensitivity peak of the magenta layer of the color print material.

The color filters of the drum 22 are in exact phase and correspondence with the color filters of drum 18. Thus, whenever a red filter is presented before the photomultiplier tube 16, a red filter is also presented in front of the picture tube 24. This is proper because the red picture information is detected from the negative 10 while the negative is scanned through the red filter of drum 18, and this same red information is displayed at the same time at the picture tube 24. The selection of the exact spectral hues of the color filters of the drum 22 is not quite so important or critical to the operation of the apparatus as is the selection of the scanning filters for drum 18. The basic reason for this is that the color reproductions generally made from color negatives are of the subtractive color type whereas the apparatus being described is of the additive color type. Almost any set of red, green and blue filters in an additive system that yield a white color balance when the picture tube 24 is at a constant brightness, will give a higher degree of color purity than the best dyes available for a subtractive color system. However, where the apparatus is used for the particular purpose of determining color print exposure constants, careful selection of the hues of the display filters of the drum 22 may be employed to enhance the "match" between the calibration of the machine and the photographic properties of the color print materials.

Since the filter drum 22 for the picture tube 24 is continuously revolving, and does not stop for each color scan operation, the sweep of the picture forming cathode ray raster is preferably carried out in the same direction across the face of the picture tube 24 as the directon of progress of the color filters of the filter drum 22. Thus, for instance, the cathode ray deflection circuits provide for a single slow sweep across the face of the tube on one axis and a plurality of sweeps on the other axis to cover the area of the picture scan. Accordingly, the single slow sweep of the cathode ray spot is preferably carried out in the same direction across the face of the picture tube 24 as the direction of progression of the color filters. This assures that the color filter aperture will not interrupt part of the picture.

The gain of the system (which controls the density and color balance of the display) is individually adjustable for each of the three color fields by adjusting the gain of the photomultiplier tube. The actual adjustments are accomplished by the three variable resistors 46, 48, and 50, by which the voltages upon capacitors 40, 42, and 44 are determined. Control of the gain of the system for this purpose is accomplished by controlling the input signals to the dynode amplifier 38 in a sequence corresponding to the colors, and in accordance with the voltages stored upon the capacitors 40, 42, and 44. The voltage thus provided by the dynode amplifier 38, through connection 36, controls the gain of photomultiplier tube 16. The sequential switching of the capacitors 40, 42 and 44 to control amplifier 38 is accomplished by the transistors 52, 54, and 56 under the control respectively of amplifiers 58, 60, and 62. These amplifiers are controlled by appropriate slotted timing tracks of the timing disk 30, through phototransistors 64, 66, and 68. These color timing signals from amplifiers 58, 60, and 62 are also employed, through the medium of switching transistors 70, 72, and 74, to sequentially switch electrical signal values representative of the adjustments of the variable resistors 46, 48, and 50 through a transistor 76 to an amplifier 78. Signals based upon these adjustments are periodically gated from the output of amplifier 78 through a gate 80 to thereby vary the charge voltages upon capacitors 40, 42, and 44. The opening of the gate 80 is accomplished only during a short interval prior to each raster scan operation of the scanner 12 by another timing track of disk 30, and a phototransistor 82 through an amplifier 83.

The amplifier 78 is a differential amplifier producing an output representing the difference between the signals derived from input transistor 76 and signals supplied through connection 85. The signal available to connection 85 during the brief interval when the gate 80 is opened is a very special signal. It is derived from integrated values corresponding to the integrated video signal levels for each of the different colors as evidenced by the output of the video amplifier 32 during the transmission of the respective color fields. The color signal integration circuit for providing this signal on connection 85 includes a charging resistor 100 connected to place charges on capacitors 102, 104, and 106. These respective charges correspond to the average video signal levels for the different colors as evidenced by the output of the video amplifier 32 during the transmission of the respective color fields. The capacitors 102, 104, and 106 are sequentially connected in circuit with the charging resistor 100 coincidentally with the scanning of the respective color fields by means of the transistors 108, and 110, and 112 which are respectively connected for control in response to the color field timing signals from amplifiers 58, 60, and 62.

The signals from capacitors 102, 104, and 106 are supplied to connection 125 through a transistor 126 and the associated load potentiometer. By using these integrated color outputs as the reference signal for differential amplifier 78, the display automatically adjusts towards a generally pleasing color balance and ideal color adjustments are quickly and easily achieved by the manual settings. The color corrections provided by the integrated color signals on capacitors 102, 104, and 106 represent an integration of the entire color field scan including that due to all of the illumination received by the photomultiplier 16 during the opening of any one of the particular color gates 64, 66, and 68. Each such color scan includes a period of illumination from the standard lamp 88 through light pipe 90. Since this is a standard rather than a variable factor, it represents a "dilution" of the color signal from the picture portion of the scan. Therefore, the correction signal from the integration is an undercorrected signal. Such an undercorrection feature is generally regarded as desirable, especially when the final correction is to be accomplished by manual adjustment, because it is generally easier to cope with initial undercorrection rather than with initial overcorrection. Furthermore, when a large correction is called for by the "integration" signal, it often results in an overcorrection from a practical standpoint. The adjustment of overall intensity of the picture is accomplished by adjusting the load potentiometer of the transistor 126 at 125.

The integrated color signals from capacitors 102, 104, and 106 are compared in the differential amplifier 78 with the voltages due to the setting of the color adjustment resistors 46, 48, and 50. Thus, the output of the dynode amplifier 38 is derived in response to a combination of the integrated signals from capacitors 102, 104, and 106, and the signals set by the manually variable resistors 46, 48, and 50. Final and exact color adjustments can be obtained by means of the last-named resistors. However, in many instances, the automatic color value adjustments as determined by the integrated color signals from capacitors 102, 104, and 106 are almost sufficient to achieve a pleasing color balance.

In the parent application Ser. No. 453,144, this "integrated" mode of operation was described as a desirable mode which provided a more rapid approach to a pleasing color balance. However, it is an additional feature of the present invention that a calibrated and usable output signal for each of the colors may be obtained from the system of the present invention when it is operated in the "integrated" mode together with final manual adjustments. This feature is described more fully below, particularly in connection with FIG. 3.

The outer boundary of the raster scan of the scanner tube 12 is preferably constricted on all four sides, either electrically, by reducing the beam intensity to essentially zero, or preferably by providing an opaque mask either upon or adjacent to the face of the flying spot scanner tube 12. This black border or "frame" around the picture is optically reversed with the colors by the electrical reversal of polarities within the system, and displayed as a white border for the picture at display tube 24. This white border provides a good optical reference for the viewer in evaluating the color qualities of the picture as it is viewed. This has been found to be a very valuable feature. This border signal also provides valuable optical and electrical reference level information for standardization, calibration, and stabilization of the system. For instance, at the end of each raster scan, when the flying spot scanner is blanked out by the border, there is a zero optical input to the photomultiplier tube 16. Therefore, during this particular interval, the video amplifier 32 has an output which is particularly characteristic of a zero optical input condition. This particular output of amplifier 32 is gated through a gating device 94 under the control of another phototransistor 96 responding to an appropriate aperture timing track of disk 30. This signal through gate 94 is stored on capacitor 98 to serve as a standardized "white reference" voltage for the color control signals transmitted from the resistors 46, 48, and 50 through the transistor 76. The signal provided through gate 94 to capacitor 98 is referred to as a "white reference" signal because it corresponds to a white boundary of the display provided by picture tube 24.

For the purpose of obtaining a calibrated output signal from the system of FIG. 1 for each of the colors, the following additional apparatus is provided: a reference lamp 88 is positioned adjacent to the timing disk 30 so that it will shine through an aperture track to an optical filament light pipe 90 which conveys the illumination to the photomultiplier tube 16. The filter drum 18 includes a small color filter window arranged between each adjacent pair of main color filter windows through which the reference light from light pipe 90 passes on its way to photomultiplier tube 16. The color of these auxiliary filters corresponds in each case to the next succeeding scanning filter color. The output illumination of reference lamp 88 must be held constant. A satisfactory method for achieving this requirement is to employ an incandescent filament lamp, operating at a carefully regulated voltage which is well below the rated voltage of the lamp. The output of the amplifier 32, as it appears on connection 86, is sampled during the interval of exposure of the photomultiplier tube 16 to illumination from the standard lamp 88. The sampling is accomplished by additional gates 114, 116, and 118 shown at the bottom of the figure. These gates are under control of the timing track device 82 through amplifier 83. The output switching signals from gates 114, 116, and 118, on output connections 119, 120, and 121, respectively, represent a coincidence of the color gate signals from devices 64, 66, and 68, and the very brief timing signal available through device 82 which occurs during every color cycle. The switching signals on connections 119, 120, and 121, are operable to gate the output of amplifier 32 at connection 86 to establish charge signal voltages on three separate storage capacitors 122, 123, and 124, shown in FIG. 3. The charges on these capacitors represent corrected and standardized color value information which can be directly employed as printing information for the production of color prints from the negative being scanned at 10 in FIG. 1. Thus, the video output signal from amplifier 32 during the portion of each color field represented by the timing track at device 82, represents the gain setting for the picture being displayed. Since the output is a function of the illumination from standard lamp 88, which remains substantially constant, the result is reproducible for each of its various possible values. The constant illumination from lamp 88 provides a reference level for these gain settings. This reference determination is made by shining the lamp 88 through colored filters of drum 18 corresponding in hue to the colors of the filters through which the picture is scanned so as to provide for a color corrected reference level. The other features disclosed in FIG. 3 are described below, after the detailed description of FIG. 2.

It is believed to be quite an interesting and unique feature of this invention that the same video amplifier 32 is employed for virtually every function of the system, including derivation of an integrated color signal for capacitors 102–106 through resistor 100, derivation of a white reference level signal for capacitor 98 through gate 94, appropriate amplification of every one of the three color signals through the main signal channel including gamma corrector 34, and finally for the derivation of calibrated color outputs during the timing interval for lamp 88 through output connection 86.

Figure 2:
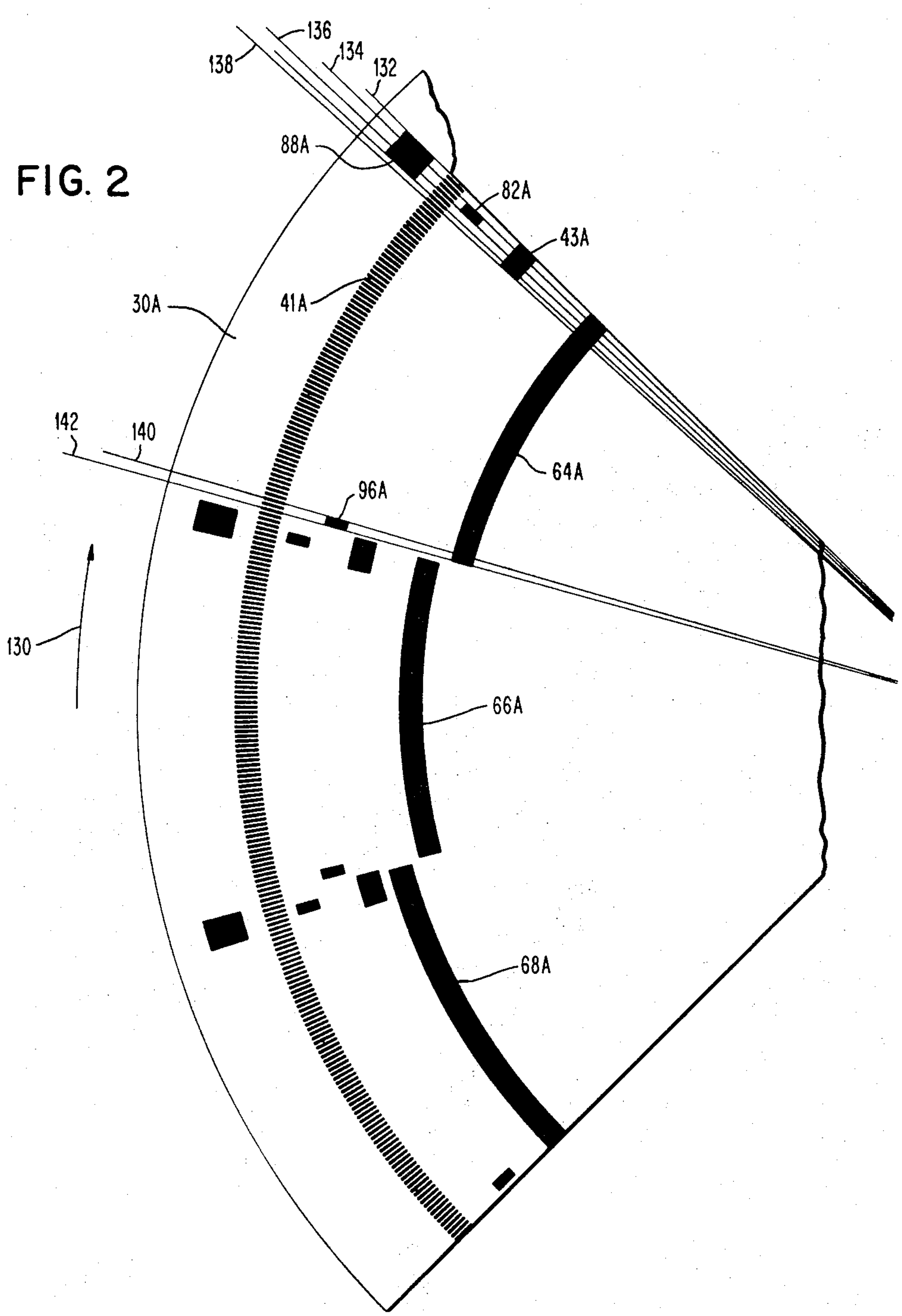
FIG. 2 is a representation of a segment of the basic timing element disk of the system of FIG. 1.
Figure 3:
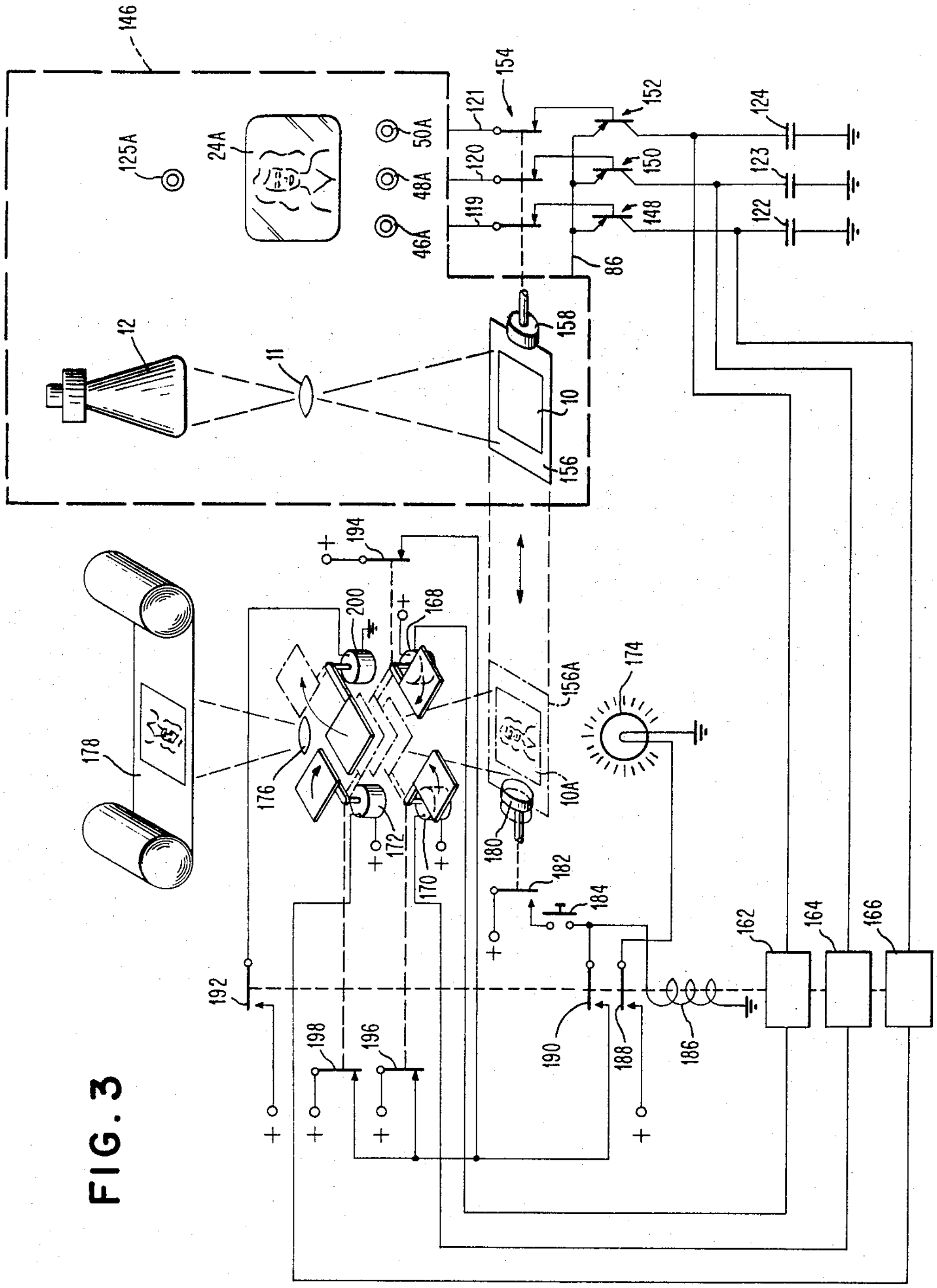
FIG. 3 is a simplified schematic representation of a preferred embodiment of an electronic color viewer and print timer apparatus in accordance with the present invention, and including the color viewer of FIG. 1.

FIG. 2 is an exact representation of a ninety-degree segment of an apertured timing disk suitable for employment in a system in accordance with the present invention and corresponding to the timing disk 30 schematically illustrated in FIG. 1. The various timing tracks obviously may be arranged in any convenient radial order upon the disk. The order of the tracks shown in FIG. 2 does not correspond exactly with the order represented in the schematic diagram of FIG. 1. The outer track of FIG. 2 is for the reference lamp apertures 88A for the reference lamp 88. For convenience and clarity, all of the other track apertures illustrated in FIG. 2 are identified by numbers corresponding to the associated phototransistors of FIG. 1, but with the suffix "A" added. Thus, the horizontal raster sweep track apertures are shown at 41A, the vertical at 43A, the three color control track apertures at 64A, 66A, and 68A, the reference lamp gate signal track apertures at 82A, and the white reference gate signal track apertures at 96A. It will be understood that the entire timing disk simply consists of four quadrants identical to the single quadrant illustrated in this figure.

The timing of the operation of the system of FIG. 1 will now be described in relation to the apertures illustrated in FIG. 2. The direction of rotation of the disk as illustrated in FIG. 2 is to be clockwise, as indicated by the arrow 130. Thus, the switching functions accomplished by the various apertures are timed in accordance with the aperture spacings proceeding downwardly from the top of the figure. These various spacings have been identified by radius lines which have been added in the figure only for convenience in explaining the timing relationships.

At the starting time for the cycle of a particular picture scan, as illustrated by radius line 132, each of the following apertures open: the color gate aperture 64A, the reference lamp aperture 88A, and the vertical sweep timing aperture 43A. Upon receiving the signal occasioned by aperture 43A, the vertical sweep amplifier 28 is operable to blank out the cathode ray beams in both the scanner 12 and the display tube 24, to return the beam vertical deflection circuits to the top of the raster scan pattern, after just having previously completed a vertical scan from top to bottom. The blanking aperture 43A preferably opens before the reference lamp aperture 88A so that the reference lamp signal does not become part of the displayed picture. After the reference lamp aperture 88A is fully opened to the lamp 88, and the color gate controlled by aperture 64A fully on, and during the blanking of both cathode ray tubes by the vertical sweep signal from aperture 43A, a short reference gate signal is provided by aperture 82A, as defined by radii 134 and 136. By the time indicated by radius 138, the reference lamp aperture 88A has been closed, and the vertical return sweep and blanking functions accomplished by the vertical sweep aperture 43A are ended. Scanning and display of the picture then proceed, the rapid horizontal scans being controlled by the short apertures of track 41A. At the end of the cycle for this particular frame, during scanning of the "white border," the white reference gate signal is provided by aperture 96A during the interval indicated between radii 140 and 142. If desired, the white reference signal may be taken during the "white border" interval at the beginning of each picture scan frame, rather than at the end.

The cycle just described is then substantially repeated, the only difference being that a different color gate represented by aperture 66A is opened. After another repetition of the frame scan cycle, with the third color gate represented by aperture 68A opened, the cycle is again repeated with the first color as the disk continues to rotate into the next quadrant. While the system has been described with reference to an embodiment having twelve scanning frames per revolution, it will be quite apparent that the system may be designed to have a different number of frames per revolution if desired.

It is a particularly interesting and useful feature of the invention that even the rapid horizontal scanning function is controlled and timed by an aperture track 41A of the aperture disk 30. The horizontal sweep amplifier 26 preferably includes an input circuit which is tuned to resonate at the frequency to be expected from the track 41A at the usual speed of disk rotation. This tuned input circuit therefore operates very much as an oscillator except that it is not truly capable of self-sustaining oscillations which persist for more than a few cycles. Thus, the actual frequency of oscillation is completely and precisely controlled by the track 41A. The input frequency provided by track 41A is conveniently doubled so that the number of horizontal scans per frame is precisely twice the number indicated by the frequency of the apertures in track 41A. If desired, a second doubling of frequency, or a higher order multiplication of frequency, may be employed to provide a higher number of horizontal scans per frame, and completely synchronized with the rotation of the timing disk 30 and the two color filter drums 18 and 22.

The number of horizontal sweeps provided by a horizontal sweep circuit 26 under the control of track 41A is preferably comparable to the number of horizontal sweeps employed in commercial television picture transmission. Preferably, the present system also employs the usual interlace sweep system such that the horizontal sweeps for each successive raster scan are vertically displaced by a distance equal to one-half of the spacing between adjacent horizontal sweeps of a single scan. Thus, the horizontal sweeps of each scan are interlaced between the horizontal sweeps of the last previous raster scan, and the result is a picture which appears to have twice as many horizontal sweeps as each frame provides. In the present invention, since the scans for the different colors are interlaced with one another, a truly complete color picture with all three colors represented on both interlace scan patterns requires six scanning frames corresponding to one-half of a full revolution of the motor 20 and the filter drums 18 and 22.

It is apparent from the preceding explanation that the display apparatus including the picture tube 24 and the color filter drum 22 provide a three-color display in terms of a repeating sequence of red, blue, and green "pictures." When the system is operated at a sufficient speed, generally in excess of forty-eight of the three-color sequences per second, and preferably sixty of the three-color sequences per second (one hundred eighty total fields per second), the persistence of the color fields in the eye of the viewer provides the visual effect of a stationary full color image. The preferred speed of one-hundred eighty total fields per second corresponds to a rated speed for motor 20 of nine hundred revolutions per minute.

Referring again to FIG. 3 of the drawings, the enclosure 146 is intended to indicate the entire viewer apparatus illustrated in FIG. 1 of the drawings. As previously mentioned above, the output of the video amplifier 32 in FIG. 1 appears at connection 86, and is gated by signals on connections 119, 120, and 121 to thereby determine the charge voltages on capacitors 122, 123, and 124. This switching function is accomplished by means of transistors 148, 150, and 152 which receive the gating signals at their base electrodes through switch contacts indicated at 154.

The photographic original 10 is preferably supported and carried upon a slidable carrier 156. When the carrier 156 is securely positioned within the viewer 146, it bears against a switch actuator plunger 158 to close the switch contacts 154 and to thereby store the color printing information upon the capacitors 122, 123, and 124. It is obvious that additional contacts may be provided on switch 154, if desired, in order to indicate that the photographic original is in the viewing position and the storage function is operable. Furthermore, the switch 154 may be omitted, if desired, in some modifications of the apparatus. For clarity, 154 is shown as a simple switch in the drawing. In an actual physical embodiment, a relay is preferably used at this point to shorten the signal lines from connections 119, 120 and 121.

The system of FIG. 3, as described thus, and incorporating the apparatus of FIG. 1, provides a color original viewer which is capable of storing exact and precise color exposure information signals on capacitors 122, 123, and 124. These signals obviously may be utilized in various ways. For instance, the voltage values on the above-mentioned capacitors may be appropriately digitized by digital volt meter apparatus and recorded for later use in setting up separate color photoprint apparatus. Similar recording of these voltage values may be accomplished also without conversion to digital form.

A particularly useful feature of the invention, however, is that these electrical voltage signals on capacitors 122, 123, and 124 can be directly used to control color printing apparatus, and it is another important feature of this invention to provide combined viewing and print timing apparatus controllable by the print timing signals appearing on the above-mentioned capacitors.

At various points in this specification, reference is made to the derivation and utilization of signals representing "color print timing data" or requirements. It is to be understood that where this terminology is not obviously restricted to the determination of time, the term "timing data" is intended to include relative data which is capable of controlling the printing exposure of color prints by methods other than time control, such as by adjusting the exposure for the various colors through the use of apertures or filter devices.

The remainder of the apparatus illustrated in FIG. 3, and not yet descriped, represents a preferred embodiment of a color printing apparatus which is controllable from the voltages stored on capacitors 122–124 and which is particularly well adapted for combination in the entire system of FIG. 3.

Figure 4:
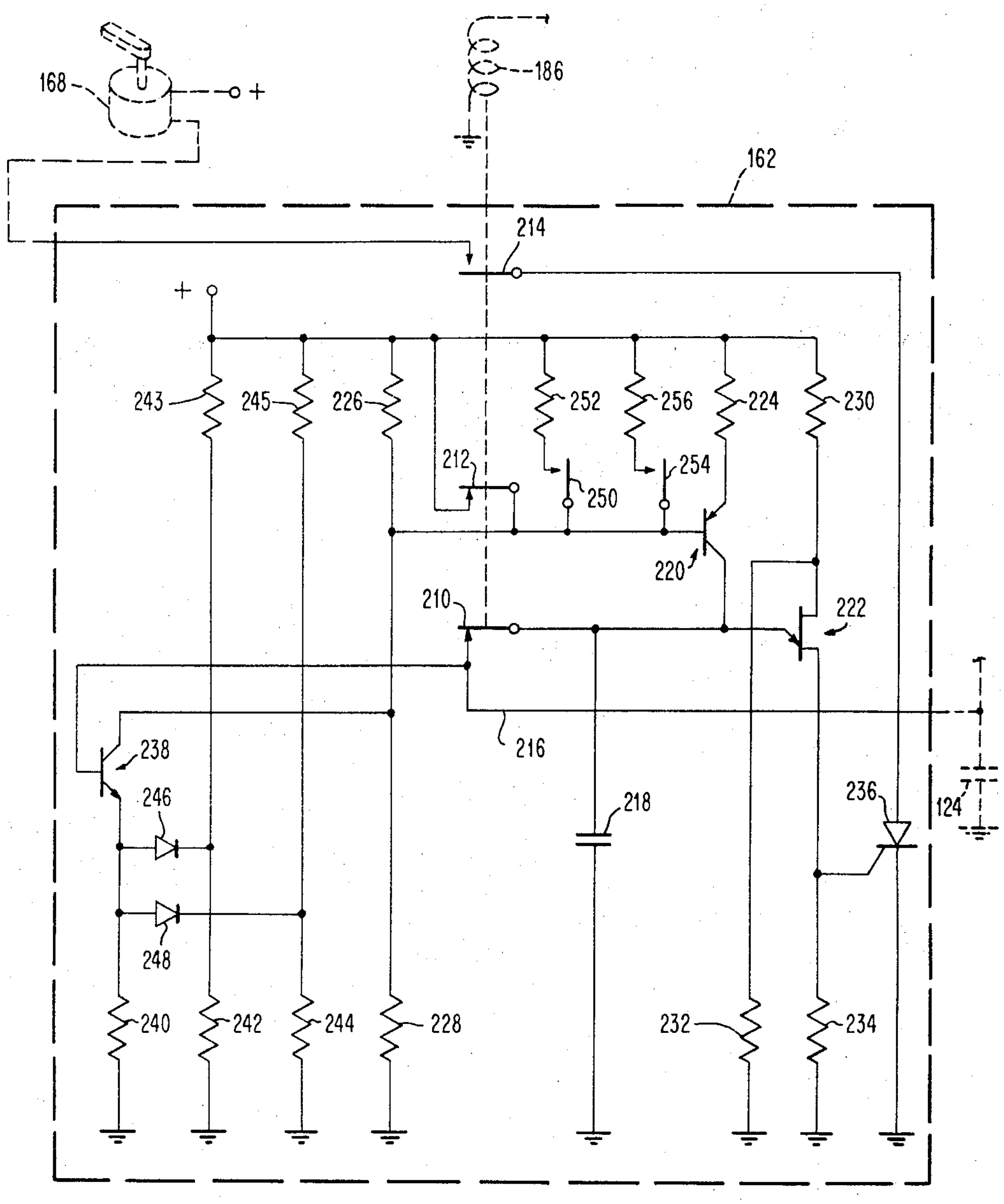
FIG. 4 is a schematic circuit diagram giving the details of a novel electronic circuit in accordance with the present invention which is particularly useful in the color print timer system of FIG. 3 for converting a voltage level to a timing period.

The operation of the system of FIG. 3 may be briefly described as follows: The photographic original 10 is positioned in the viewer as shown in the drawing. The intensity control knob 125A, representing the adjustment of potentiometer 125 in FIG. 1, and the color control knobs 46A, 48A, and 50A, which represent the adjustment knobs for color control resistors 46, 48, and 50, of FIG. 1, are all adjusted to achieve the correct intensity and color values in the picture displayed from viewing tube 24, as indicated at 24A in FIG. 3. Then the support 156 for the photographic original 10 is moved to the left in the drawing to a position 156A. The voltages on capacitors 122–124 are then converted in timing circuits 162, 164, and 166 provide output signals after exposure intervals determined by those respective voltages. These output signals then actuate the rotary solenoids 168, 170, and 172. The rotary solenoids each insert a color filter into an optical printing path including a lamp light source 174, the photographic original indicated at 10A, the color filters, a lens 176, and photographic print paper 178. The actuation of each of the color filters by the rotary solenoids 168, 170, and 172 terminates the printing exposure for the particular color represented by that filter as the filter is interposed in the light path. The actuated positions of these filters are shown in dotted outline in the drawing. The details of the timing circuits 162–166 are illustrated in FIG. 4 and described fully below.

A more detailed description of the construction and operation of the printing apparatus of FIG. 3 is as follows: When the carrier 156 for the photographic master 10 is moved to the position 156A, it engages a switch actuating plunger 180, moving it to the left in the drawing to the position shown in dotted outline. This closes the associated switch contact 182 to set up a circuit to a start button 184. The movement of the carrier 156 away from the viewer releases the switch plunger 158 and opens the switch contacts 154 so that the charge signals on capacitors 122–124 are no longer charged, and remain as last determined from the viewing of the negative 10. When the operator is satisfied that the printer is ready for operation, he actuates the start switch 184, completing an energizing circuit to the winding of a relay 186. The energization of relay 186 actuates various contact switches within the time delay circuits 162–166 to initiate the timing operation thereof.

The energization of relay 186 also closes various relay contacts 188, 190, and 192. The circuit closed by contact 188 provides power to the lamp 174. The contact 190 closes a "holding" circuit for the winding of relay 186 through parallel connected normally closed solenoid contacts 194, 196, and 198 described below. The contact 192 closes a circuit to energize a rotary solenoid 200 which moves a capping shutter 202 from the position shown in solid lines in the drawing, and in which it blocks off light from lamp 174 to the film 178, to the retracted position shown in dotted outline. Until the optical filter elements associated with the rotary solenoids 168, 170, and 172 are actuated, the image from original 10 resulting from the full unfiltered value of white light from source 174 is focused upon the print paper 178. It is understood that the lamp 174 is preferably provided with a diffuser which is capable of diffusing the light as it is supplied to the photographic original 10 in its position 10A.

The normally closed contacts 194, 196, and 198 are respectively associated for operation with the rotary solenoids 168, 170, and 172. Thus, each switch is opened as the associated filter is moved into position in the path of the printing light to the print paper 178. Therefore, the holding circuit for relay winding 186 remains energized until the last of the filters is actuated into position in the light path. At that time, the holding circuit is broken, the relay 186 drops out. As a result, the lamp 174 goes off, the capping shutter associated with rotary solenoid 200 rotates back into the original position shown in the drawing, the timing circuits 162–166 are reset to the starting condition, and thus the filter solenoids 168–172 are released. The printing cycle is thus completed, and the system is ready to be set up to view and then print the next color original.

FIG. 4 illustrates in detail a preferred embodiment of the time delay circuits 162–166. Since these circuits are virtually identical, only one of them is illustrated and described in detail. This is arbitrarily designated as circuit 162 in FIG. 4. In order to promote an understanding of the interrelationship of the circuit 162 with the other components of the system, the storage capacitor 124, the filter solenoid 168, and the relay winding 186 are each shown in dotted outline to clearly indicate their relationship to the circuit components within circuit 162. The relay 186 includes normally closed contacts 210 and 212, and normally open contact 214 within the circuit 162. The main input connection to circuit 162 from the signal capacitor 124 is indicated at 216. It is normally connected, during the viewing cycle and prior to initiation of the printing cycle, through the normally closed relay contact 210 to charge a capacitor 218. Capacitor 218 is thus charged to essentially the same voltage as the signal appearing across the capacitor 124. The upper terminl of capacitor 218 is connected in the collector circuit of a transistor 220, but this transistor is biased to a nonconductive condition by a circuit from its control (base) electrode to the positive power supply provided by the normally closed relay contact 212. A unijunction transistor 222 is provided, having its emitter connected to the upper electrode of capacitor 218, and is biased off because the potential level achieved prior to the printing operation is simply insufficient to initiate conduction.

When the print timing operation is initiated, the capacitor 218 is isolated from the input circuit 216 by the opening of relay contact 210. Also, the bias circuit for transistor 220 provided by relay contact 212 is opened so as to initiate conduction in that transistor. The collector current of transistor 220 then charges capacitor 218 to progressively higher voltage levels. The rate of charge is a function of the collector-emitter current as determined by the potential of the base electrode of transistor 220. That voltage is controlled by a voltage divider including resistors 226 and 228. After a period of exposure time as determined by the initial input voltage and the various circuit constants, the charge potential on the upper terminal of capacitor 218 is sufficient to initiate conduction in unijunction transistor 222. The potential at which this occurs is determined primarily by the no-load potential established on the upper electrode of the unijunction transistor by means of a voltage divider including resistors 230 and 232. The initiation of conduction "break over" of unijunction transistor 222 causes a discharge of capacitor 218 through the unijunction load resistor 234.

Connected to the unijunction load resistor 234 is the control electrode of a silicon controlled rectifier (SCR)

236. The pulse of current through unijunction load resistor 234 creates a voltage pulse, as seen by SCR 236, which initiates conduction in that device. The resultant current through SCR 236 is supplied through a circuit including the relay contact 214 to energize the optical filter solenoid 168, thereby ending the print exposure period for the color controlled through circuit 162.

It will be appreciated from the above explanation of the basic structure and operation of circuit 162 that this circuit accomplishes an inversion of the signal appearing on the capacitor 124. That is, the higher the potential on input capacitor 124, the shorter the exposure period for the color which is under control. This is true because the higher the initial charge on capacitor 218, the shorter the period of additional charging of capacitor 218 until firing of the unijunction transistor 222 and the SCR 236. This inversion operation is proper in order to match the operation of the viewer and the amplifier 32 to the requirements of the printing system. The inversion is related to the photographic inversion achieved in providing a positive picture from a negative original. Generally speaking, the higher the transmissibility of the negative to light, the higher the output of the amplifier 32 of FIG. 1 will be, and the lower the printing time which will be required. It is apparent that the signal inversion could be incorporated into the system ahead of the charging circuit for the capacitor 124, and then the circuit 162 would be redesigned to operate in the opposite sense to provide a time duration which is a positive function of the charge voltage on capacitor 124 rather than a negative function. In either case, the time is determined by the difference between the initial charge voltage on capacitor 124 and a predetermined reference voltage.

In the present embodiment, the reference voltage is the "firing" potential for unijunction transistor 222 as determined by the ratio of the resistances 230 and 232. This reference voltage level should correspond to a signal voltage level on capacitor 218 which is appropriate for a photographic negative original 10 which is essentially transparent. This level may be determined in a practical way. This reference voltage level corresponds to a white area or a picture which has no information whatsoever. As a practical matter, this voltage level may be determined and set by adjustments of the resistors 230 and 232 with the reference lamp 88 turned off. This corresponds to a zero gain of the amplifier 32. This is clearly understood if it is recognized that the amplifier output at 86 during the reference interval determined by the signal picked up by device 82 represents the product of the illumination from lamp 88 and the gain of amplifier 32. It must also be recognized that amplifier 32 contains an inversion, so that the lower the optical input, the higher is the DC level of the electrical output at connection 86.

Referring again to FIG. 4, the ratio of the resistances 230 and 232 determines the "firing" point of the unijunction transistor 222. However, the absolute values of these resistors are preferably selected to provide a parallel impedance which controls the unijunction transistor currents so as to minimize temperature sensitivity of the unijunction transistor, in accordance with well-known principles relating to these devices.

To a first order of approximation, effective print exposure is linear with exposure time. However, the reciprocity failure characteristics of most print materials require a long exposure to be more than twice as long as a short exposure to have twice the effect. That is, the efficiency of the print material in response to light becomes less at longer exposure times. Thus, even though the voltage of capacitor 124 is an accurate indication of required exposure, when this information is used to control exposure time, the actual exposure time must be modified to correct the reciprocity failure. (If translated to light intensity changes, rather than exposure times, the capacitor voltage on capacitor 124 would provide accurate results without need for correction for reciprocity failure.) For most practical exposure times (0.1 second and longer), the effect of reciprocity failure is to require more exposure with longer exposure time than would otherwise be necessary. A transistor 238, and associated resistors 240, 242, 243, 244, and 245 and associated diodes 246 and 248 provide the necessary reciprocity failure compensation.

When capacitor 124 is more positive than a typical minimum value (indicating a shorter required exposure), transistor 238 is turned on more and a greater emitter voltage appears across the emitter load resistor 240, and the collector current of transistor 238 is increased. This increased collector current increases the voltage drop across voltage divider resistor 226, thus lowering the potential at the base of transistor 220. This new control voltage level on transistor 220 increases the emitter-collector current and causes capacitor 218 to achieve the breakover potential for unijunction transistor 222 in a space of time which is shorter than would be expected in the absence of this auxiliary control of transistor 220.

If the input voltage is less positive on capacitor 124 (indicating a demand for more exposure), the collector current of transistor 238 is lower, and thus the collector current of transistor 220 is lower and the time required for capacitor 218 to achieve the breakover voltage of unijunction transistor 222 is lengthened by more than a linear function of the lowering of the input voltage. Further nonlinearity compensation is available by the action of diodes 246 and 248 and the associated voltage dividers. For even higher voltages on capacitor 124 (indicating even shorter exposure times), the emitter current and voltage of transistor 238 is sufficient to initiate conduction in diode 246. With diode 246 conducting, its voltage divider resistors 242 and 243 are effectively connected in shunt with resistor 240 in the emitter circuit of transistor 238. This changes the gain of transistor 238 and further modifies the linearity of time response to voltage input from capacitor 124. The voltage divider resistors 244 and 245 are selected and adjusted to cause diode 248 to become conductive at still a different potential level. Thus, by adjusting the cut-in points of diodes 246 and 248, an approximation of an ideal nonlinear response curve can be achieved. If necessary, additional diodes and voltage dividers can be added to cut in at different points in order to approximate the ideal characteristic even more closely. It will be understood that in order to achieve ideal controls of these nonlinear networks, one or both of the resistors 244 and 245 in a typical voltage divider may be made adjustable. Furthermore, a variable series resistor may be inserted in series with each of the diodes, such as diode 248 in order to adjust the change in emitter load impedance occasioned by turning on the diode, independent of the adjustment of the voltage divider.

Referring back again to FIG. 3, whenever one of the color filters, such as the one actuated by filter solenoid 168, is interposed into the light path, it not only absorbs the light of its own color, but it also absorbs at least part of the light of the other colors. Thus, assume that the capacitor 124 controls the exposure of the print to blue light. If either the green or the red exposure ends before the blue exposure, the introduction of the magenta, or the cyan filter, while generally passing blue light, absorbs at least some part of it, and thus a lengthening of the exposure time for the blue is required to compensate for this absorption. This is accomplished in the circuit of FIG. 4 by providing an auxiliary switch contact 250 which is closed when the magenta filter is moved into the light path, to thereby close a circuit through a resistor 252 in the base electrode circuit of transistor 220. This reduces the collector current in transistor 220 so as to increase the exposure time until the breakover potential for unijunction transistor 222 is achieved. A similar switch 254 and resistor 256 are provided to become operative when the cyan filter is moved into the light path. Thus, if either the magenta or cyan filters are moved into the light path before the blue exposure is completed, the blue exposure period is automatically extended to compensate for the blue absorption of the magenta and cyan filters. Furthermore, if both the magenta and cyan filters are moved in before the blue exposure is completed, then appropriately, separate extensions of the blue exposure period are occasioned by the closure of both of the switches 250 and 254.

The system illustrated in FIGS. 3 and 4, including arrangements for producing color prints, is shown in schematic form only. Many additional automatic features may be provided, if desired. For instance, the printing paper 178 may be advanced automatically by means of a suitable drive mechanism each time a new color print is to be produced. Furthermore, it will be understood that other steps in the processing of the color print may be performed in the usual manner, preferably by automatic print processing machinery of conventional construction which is not shown in detail here.

Various different mechanical arrangements for viewing, handling, and printing the photographic negatives may be adopted as desired or needed, but without departing from the spirit and the scope of the present invention. In particular, different mechanical features may be very desirable where the pictures to be printed are motion pictures rather than "stills."

The system is also adaptable to a higher degree of automation than is illustrated. For instance, while only one set of storage capacitors 122–124 is shown in the system of FIG. 3, it is obviously possible to have several sets of such capacitors, and to have the switching device such as device 154 select different separate sets of capacitors instead of simply disconnecting the set shown. Thus, the printing information stored on one set of capacitors could be employed for controlling the print exposure, while new print information is being stored on a different set of such capacitors. Thus, a continuous process would be possible in which perhaps four negative carrier stations might be provided for. The first would be a loading station, the second would be a viewing station, the third would be a printing station, and the fourth would be an unloading station.

While the printing system shown in FIG. 3 is basically a time exposure control system, it is obvious that printing systems based upon intensity of exposure may be employed if desired, and subjected to the control of the voltages stored on capacitors 122–124. For instance, the voltage level signals may be employed to select color filters for each color having different absorption properties dependent upon the control of the exposure which is required for a particular print. All colors may then be exposed simultaneously through a combination of color filters which achieve the proper color balance in the print. Other modifications of variable intensity exposure control may also be employed. For instance, the system may be set up with separate electric printing illumination lamps for each of the component colors being printed, and the lamp filament voltages may be varied in order to obtain different illumination intensity values as required by the control system. Preferably, in such a system, the operation automatically provides for maximum lamp intensity for the color requiring the highest intensity printing so that the total printing interval may be as short as possible. Other alternative modifications of variable intensity printing may employ filters, or combinations of filters and shutters, which are adjustably positionable in the path of the printing illumination to thus vary the intensity.

The system in accordance with the present invention may include various features disclosed in the patent application Ser. No. 453,144, such as, for instance, the "zoom" and enlargement features in the viewer.

In the operation of the viewer, as shown in FIG. 1, a final adjustment of correct color balance is achieved by manipulation by the operator of the variable resistors 46, 48, and 50. While these adjustments are illustrated as variable resistors of the type having a smooth and continuous resistance adjustment, it is preferred to provide push button selectors to accomplish these adjustments. Each push button provides a definite incremental change in the resistance value. This makes it easier for the operator to decide when the adjustments are completed.

As mentioned in the parent case, the white border around the picture display at picture tube 24 is very valuable in providing a reference color from which the operator can make a good adjustment for each color.

While this invention has been shown and described in connection with preferred embodiments, it is apparent that various changes and modifications, in addition to those mentioned above, may be made by those who are skilled in the art without departing from the basic features of the invention. Accordingly, it is the intention of the applicants to protect all variations and modifications within the true spirit and valid scope of this invention.

What is claimed is:

1. An electronic color viewer system for presenting a color representation of pictorial information contained on a photographic original comprising photoelectronic means to scan said original and to generate electrical signals in accordance with the pictorial color information contained therein, amplifying means connected and arranged to receive and amplify said color information signals, at least one cathode ray picture tube connected and arranged with said amplifying means to produce a color picture representation from said color information signals, means connected to said amplifying means for deriving an electrical signal level for each color representative of an integrated value of the intensity of that color for the entire picture as detected by said photoelectronic means, switching means operable to connect said integrated color signal to regulate the gain of said photoelectronic means and said amplifying means to thereby automatically adjust the system in the direction of a correct color balance, means connected to said amplifying means for deriving and storing electrical signals corresponding to said regulated gain adjustments, and a nonlinear gain characteristic means connected between said amplifying means and said cathode ray picture tube to provide a gain characteristic for said color picture representation corresponding to the photographic contrast paper on which the picture of said photographic original is to be printed.

2. An electronic color viewer system for presenting a color representation of pictorial information contained on a photographic original comprising photoelectronic means to scan said original and to generate electrical signals in accordance with the pictorial color information contained therein, amplifying means connected and arranged to receive and amplify said color information signals, at least one cathode ray picture tube connected and arranged with said amplifying means to produce a color picture representation from said color information signals, means connected to said amplifying means for deriving an electrical signal level for each color representative of an integrated value of the intensity of that color for the entire picture as detected by said photoelectronic means, switching means operable to connect said integrated color signal to regulate the gain of said photoelectronic means and said amplifying means to thereby automatically adjust the system in the direction of a correct color balance, means connected to said amplifying means for deriving and storing electrical signals corresponding to said regulated gain adjustments, said electrical signals corresponding to said regulated gain adjustments being standardized and calibrated for the separate color components represented thereby, said scan signals being obtained by passing scanning illumination through separate color filters for each of the primary color components of the picture, separate illumination being provided from a standard illumination source through a color filter corresponding to each of said primary color filters to said photoelectronic means between picture scan operations, thereby generating electric signals through said photoelectronic means and said amplifying means to provide said electrical signals corresponding to said regulated gain adjustments.

3. A system as set forth in claim 2 in which said integrating means operates to integrate the video signal for the entire picture and including the video signal produced as a result of the illumination from said standard illumination source to thereby provide an under-correction effect.

4. An electronic color viewer system for presenting a color representation of pictorial information contained on a photographic original comprising photoelectronic means to scan said original and to generate electrical signals in accordance with the pictorial color information contained therein, amplifying means connected and arranged to receive and amplify said color information signals, at least one cathode ray picture tube connected and arranged with said amplifying means to produce a color picture representation from said color information signals, means connected to said amplifying means for deriving an electrical signal level for each color representative of an integrated value of the intensity of that color for the entire picture as detected by said photoelectronic means, switching means operable to connect said integrated color signal to regulate the gain of said photoelectronic means and said amplifying means to thereby automatically adjust the system in the direction of a correct color balance, means connected to said amplifying means for deriving and storing electrical signals corresponding to said regulated gain adjustments, and color print exposure means connected for operation in accordance with said stored electrical signals corresponding to said regulated gain adjustments.

5. A system in accordance with claim 4 including a source of print exposure illumination, and including color filter means selectively operable in accordance with the values of said stored electrical signals to be interposed in the path of said printing illumination to thereby achieve the correct color values in the resultant print.

6. A system in accordance with claim 5 in which said print exposure means includes separate time delay circuits for each of said stored electrical signals, and in which said stored electrical signals correspond to separate component colors of said photographic original, each of said time delay circuits being operable in response to one of said stored electrical signals to provide a time delay in accordance with the stored electrical signal value, and means operable by each of said time delay circuits at the end of said time delay period for moving one of said color filters into the path of said color printing illumination to terminate the print exposure period for the color corresponding to that particular filter.

7. A system in accordance with claim 6 in which said last-named means comprises an electromagnetic motor device.

8. A system in accordance with claim 7 in which said motor device comprises a rotary solenoid.

9. A system in accordance with claim 6 including a capping shutter normally positioned to obstruct the print exposure illumination and being operable to be removed from said print illumination path upon initiation of a print cycle, and to be restored to said illumination path upon the completion of a print cycle.

10. A system as set forth in claim 6 in which each of said timing circuits includes a capacitor which is initially charged to a voltage corresponding to the associated stored electrical signal, a charge changing circuit for said capacitor having a controllable charging rate, switching means operable upon the initiation of the operation of said printing means for disconnecting said capacitor from said stored electrical signal and for initiating the operation of said charge changing circuit, and switching means operable in response to the charge voltage on said capacitor after a period of operation of said charge changing circuit determined by the initial charge on said capacitor to complete a circuit for the actuation of the associated color filter.

11. A system in accordance with claim 10 in which said charge changing circuit includes nonlinear circuit means connected for operation in response to the initial stored electrical signal to provide for different charge changing current rates to compensate for nonlinearities in the exposure time response of the color print paper on which the print is to be produced.

12. A system in accordance with claim 10 in which each of said timing circuits includes switching means operable to reduce the current in said capacitor charge changing circuit when each of the other filter elements is moved into the printing light path in order to thereby increase the exposure time to compensate for absorption of printing light by each of said other filters within the color spectrum controlled by the filter associated with said timing circuit.

13. A system in accordance with claim 6 including means operable in response to the movement of each filter into the color print exposure path to increase the time of exposure for each of the other colors to thereby compensate for absorption of said colors by said filter.

14. A system in accordance with claim 5 in which said filter means vary the intensity of the various individual color components of the print exposure illumination in accordance with said stored electrical signals.

15. A system in accordance with claim 4 including means for supporting and transporting said photographic original from a scan position to a printing position, and switching means operable by said transport means for disconnecting said electrical signal storing means from said amplifying means when said photographic original is transported away from said scan position.

16. A system in accordance with claim 15 including switching means operable by said transport means when said transport means is in said printing position to set up actuating circuits for operation of said printing means.

17. A system in accordance with claim 4 including means for varying the intensity of printing illumination for each of the component colors in accordance with said stored electrical signals.

18. A system in accordance with claim 17 in which the printing illumination intensity is adjusted to the maximum value of which the illumination source is capable for the color component which requires the maximum exposure.

References Cited

UNITED STATES PATENTS

| | | | |
|---|---|---|---|
| 2,543,772 | 3/1951 | Goldmark | 178—5.4 |
| 2,981,792 | 4/1961 | Farber | 178—5.2 |

ROBERT L. GRIFFIN, *Primary Examiner*

RICHARD MURRAY, *Assistant Examiner.*

UNITED STATES PATENT OFFICE
CERTIFICATE OF CORRECTION

Patent No. 3,417,196 December 17, 196

Alex W. Dreyfoos, Jr., et al.

It is certified that error appears in the above identified patent and that said Letters Patent are hereby corrected as shown below:

Column 16, between lines 48 and 49 insert -- response characteristic of a photographic color print --.

Signed and sealed this 17th day of March 1970.

(SEAL)
Attest:

Edward M. Fletcher, Jr.
Attesting Officer

WILLIAM E. SCHUYLER, JR.
Commissioner of Patents